US007225319B2

(12) United States Patent
Campi et al.

(10) Patent No.: US 7,225,319 B2
(45) Date of Patent: May 29, 2007

(54) DIGITAL ARCHITECTURE FOR RECONFIGURABLE COMPUTING IN DIGITAL SIGNAL PROCESSING

(75) Inventors: Fabio Campi, Bologna (IT); Mario Toma, Bologna (IT); Andrea Lodi, Castel San Pietro (IT); Andrea Cappelli, Faenza (IT); Roberto Canegallo, Tortona (IT); Roberto Guerrieri, Bologna (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 200 days.

(21) Appl. No.: 10/770,122

(22) Filed: Feb. 2, 2004

(65) Prior Publication Data

US 2005/0015573 A1    Jan. 20, 2005

(30) Foreign Application Priority Data

Jan. 31, 2003    (EP) ................... 03425055

(51) Int. Cl.
  *G06F 9/38*    (2006.01)
  *G06F 15/78*   (2006.01)
(52) U.S. Cl. .......................... 712/1; 712/201
(58) Field of Classification Search ............ 712/1, 712/18, 25, 34, 35, 201
  See application file for complete search history.

(56) References Cited

U.S. PATENT DOCUMENTS

| 5,648,732 | A | 7/1997 | Duncan |
| 5,956,518 | A | 9/1999 | DeHon et al. |
| 5,968,161 | A | 10/1999 | Southgate |
| 6,026,481 | A | 2/2000 | New et al. |
| 6,052,773 | A * | 4/2000 | DeHon et al. ................ 712/43 |
| 6,467,009 | B1 | 10/2002 | Winegarden et al. |
| 6,518,965 | B2 * | 2/2003 | Dye et al. ................... 345/419 |
| 6,901,502 | B2 * | 5/2005 | Yano et al. ................... 712/37 |
| 2002/0083308 | A1 | 6/2002 | De Oliverira Kastrup Pereira et al. |

OTHER PUBLICATIONS

Krishna V. Palem and Surendranath Talla; "Adaptive Explicitly Parallel Instruction Computing," Proceedings of the 4th Australasian Computer Architecture Conference, Auckland, New Zealand, Jan. 18-21, 1999, pp. 61-73.
Ralph D. Wittig and Paul Chow, "OneChip: An FPGA Processor with Reconfigurable Logic," University of Toronto, Department of Electrical and Computer Engineering, Toronto, Ontario, Canada; pp. 126-135, 1996 IEEE; 0-8186-7548-9/96.
Callahan, et al., "The Garp Architecture and C Compiler," *Configurable Conspiracy*, University of California, Berkeley, 2000 IEEE, 0018-9162/00, pp. 6269, Apr. 2000.
Rahul Razdan and Michael D. Smith, "A High-Performance Microarchitecture and Hardware-Programmable Functional Units," 1994 ACM 0-89791-707-/94/0011, pp. 172-180, March.

(Continued)

*Primary Examiner*—Eric Coleman
(74) *Attorney, Agent, or Firm*—Jenkens & Gilchrist, PC (57) ABSTRACT

A digital embedded architecture, includes a microcontroller and a memory device, suitable for reconfigurable computing in digital signal processing and comprising: a processor, structured to implement a Very Long Instruction Word elaboration mode by a general purpose hardwired computational logic, and an additional data elaboration channel comprising a reconfigurable function unit based on a pipelined array of configurable look-up table based cells controlled by a special purpose control unit, thus easing the elaboration of critical kernels algorithms.

25 Claims, 4 Drawing Sheets

OTHER PUBLICATIONS

Zhi Alex Ye, et al., "CHIMAERA: A High-Performance Architecture with a Tightly-Coupled Reconfigurable Unit," ISCA 2000 Vancouver BC Cananda, ACM 2000 1-58113-232-8/00/6, pp. 225-235.

Ricardo E. Gonzales, "Xtensa: A ConfigurablE and Extensible Processor," IEEE Micro, Mar.-Apr. 2000, pp. 60-70; 0272-1732/00, 2000 IEEE.

Kastrup, et al., "ConCISe: A Compiler-Driven CPLD-Based Instruction Set Accellerator," *Philips Research Laboratories*, date unknown.

S. Vassiliadis, et al, "The MOLEN ρμ-Coded Processor," FPL 2001, LNCS 2147, pp. 275-285, 2001.

European Search Report, EP 03 42 5055, dated Nov. 2003.

\* cited by examiner

DIGITAL ARCHITECTURE FOR RECONFIGURABLE COMPUTING IN DIGITAL SIGNAL PROCESSING

PRIORITY CLAIM

This application claims priority from European patent application No. 03425055.5, filed Jan. 31, 2003, which is incorporated herein by reference.

FIELD OF THE INVENTION

The present invention relates generally to an embedded architecture including a microcontroller and a memory device suitable for digital signal processing based on reconfigurable computing.

The invention may find application in many environments such as in multimedia applications, audio and image compression and decompression standards, security applications such as code encryption and voice/image recognition, and telecommunications protocol management such as TCP/IP and UMTS.

BACKGROUND

As is well known by those skilled in this specific technical field, a classic architectural solution to achieve high elaboration performance when dealing with critical algorithmic kernels is to enhance a general purpose microcontroller with application-specific signal processors and peripherals for the most time-critical functions.

As a matter of fact, in order to achieve sufficient volumes of transactions in presence of standards with a variable level of compliance, these platforms must often be over designed to cover the worst case of all requirements.

A further more fine-grain solution provides for a reconfigurability at instruction-set level, also improving the ease of interfacing peripherals. Another solution, developed by the Company Tensilica, offers a configurable processor "Xtensa" where instructions can be easily added at design time within the pipeline; see in this respect the article by R. E. Gonzales "Xtensa: a configurable and extensible processor" IEEE Micro, Volume: 20 Issue 2, March-April 2000.

However, the computational logic for new instructions is hardwired at design time with an ASIC-like flow, hence the processor can not be reconfigured after fabrication. This, although very successful, is still an application-specific solution with high non-recurrent engineering costs due to design and mask production.

An appealing alternative option is that of exploiting a Field Programmable Gate Array (FPGA) technology combining standard processors with embedded FPGA devices. This further solution allows to configure into the FPGA at deployment time exactly the required peripherals, exploiting temporal re-use by dynamically reconfiguring the instruction-set at run time based on the currently executed algorithm.

This solution is disclosed in the U.S. Pat. No. 5,956,518 to A. De Hon, E. Mirsky, J. Knight, F. Thomas, assigned to the Massachussets Institute of Technology and having title: "Intermediate-grain reconfigurable processing device".

The existing models for designing FPGA/processor interaction can be grouped in two main categories:

the FPGA is a co-processor communicating with the main processor through a system bus or a specific I/O channel;

the FPGA is described as a function unit of the processor pipeline.

The first group includes the GARP processor, known from the article by T. Callahan, J. Hauser, and J. Wawrzynek having title: "The Garp architecture and C compiler" IEEE Computer, 33(4): 62-69, April 2000. A similar architecture is provided by the A-EPIC processor that is disclosed in the article by S. Palem and S. Talla having title: "Adaptive explicit parallel instruction computing", Proceedings of the fourth Australasian Computer Architecture Conference (ACOAC), January 2001.

In both cases the FPGA is addressed via dedicated instructions, moving data explicitly to and from the processor. Control hardware is kept to a minimum, since no interlocks are needed to avoid hazards, but a significant overhead in clock cycles is required to implement communication.

Only when the number of cycles per execution of the FPGA is relatively high, the communication overhead may be considered negligible.

In the commercial world, FPGA suppliers such as Altera Corporation offer digital architectures based on the U.S. Pat. No. 5,968,161 to T. J. Southgate, "FPGA based configurable CPU additionally including second programmable section for implementation of custom hardware support".

Other suppliers (Xilinx, Triscend) offer chips containing a processor embedded on the same silicon IC with embedded FPGA logic. See for instance the U.S. Pat. No. 6,467,009 to S. P. Winegarden et al., "Configurable Processor System Unit", assigned to Triscend Corporation.

However, those chips are generally loosely coupled by a high speed dedicated bus, performing as two separate execution units rather than being merged in a single architectural entity. In this manner the FPGA does not have direct access to the processor memory subsystem, which is one of the strengths of academic approaches outlined above.

In the second category (FPGA as a function unit) we find some disclosed architectures known as:

"PRISC" by R. Razdan and M. Smith "A high-performance microarchitecture with hardware-programmable functional units" Proceedings of the 27th Annual International Symposium on Microarchitecture, November 1994;

"Chimaera" by Z. A. Ye, A. Moshovos, S. Hauck, P. Banerjee "Chimaera: A High-Performance Architecture with Tightly-Coupled Reconfigurable Functional Unit" Proceedings of the 27th International Symposium on Computer Architecture, 2000 Page(s): 225-235;

"ConCISe" by B. Kastrup, A. Bink, and J. Hoogerbrugge "ConCISe: A compiler-driven CPLD-based instruction set accelerator" Proceedings of the Seventh Annual IEEE Symposium on Field-Programmable Custom Computing Machines, April 1999.

In all these models, data are read and written directly on the processor register file minimizing overhead due to communication. In most cases, to minimize control logic and hazard handling and to fit in the processor pipeline stages, the FPGA is limited to combinatorial logic only, thus severely limiting the performance boost that can be achieved.

Later attempts, like the "OneChip" solution by R. Wittig, and P. Chow "OneChip: An FPGA Processor With Reconfigurable Logic Proceedings" disclosed in the IEEE Symposium on Field-Programmable Custom Computing Machines, pp.126-135, Napa Valley, Calif., March 1996, or the processor architectures proposed in the already cited U.S. Pat. Nos. 5,956,5181 and 6,026,481 address the communication problem effectively sharing registers between a processor core and an independently embedded FPGA device.

These solutions represent a significant step toward a low-overhead interface between the two entities. Nevertheless, due to the granularity of FPGA operations and its hardware oriented structure, their approach is still very coarse-grained, reducing the possible resource usage parallelism and again including hardware issues not familiar nor friendly to software compilation tools and algorithm developers.

Thus, a relevant drawback in this approach is often the memory data access bottleneck that often forces long stalls on the FPGA device in order to fetch on the shared registers enough data to justify its activation.

A more recent architecture exploiting a remarkable trade-off between the models above cited is known as "Molen" processor, developed at the TUDelft; see in this respect the article: "The MOLEN rm-coded Processor", Proceedings of the 11th International Conference on Field-Programmable Logic and Applications 2001 (FPL2001), Belfast, Northern Ireland, UK, August 2001.

"Molen" main advantage is to utilize commercially available FPGA devices to build an embedded reconfigurable architecture that couples existing processor models (Altera Nios, IBM PowerPC) with well known gate-array technology (Altera Apex 20KE, Xilinx Virtex II Pro) obtaining significant performance speed-up for a broad range of DSP algorithms.

However, even this solution presents some drawbacks due to the fact that the extension to the processor instruction set are designed by the architecture designers, and "micro-coded" in the architecture itself, rather than developed at compilation time by the user.

Moreover, due to the coarse grain of the tasks involved in the instruction set extension, the size of the introduced reconfigurable logic can severely affect the energy consumption for a given algorithm.

SUMMARY OF INVENTION

An embodiment of the present invention is that of providing a new kind of embedded digital architecture having functional and structural features capable to offer significant performance and energy consumption enhancements with respect to a traditional signal processing device.

Moreover, such a new architecture should provide a programmer-friendly algorithm development environment based on C language while ensuring usual compilation and software evaluation tools.

An embodiment of the invention overcomes the limitations of similar preceding architectures by relying on a reconfigurable device of different nature, and a new approach to processor/gate-array interface. The proposed architecture exploits concurrent use of hardwired computational logic and of an additional data elaboration channel comprising a pipelined array of configurable, look-up table based cells controlled by a special purpose control unit.

According to a first embodiment of the invention, the digital architecture previously indicated comprises: a processor, structured to implement a Very Long Instruction Word elaboration mode by a general purpose hardwired computational logic, and an additional data elaboration channel comprising a reconfigurable function unit based on a pipelined array of configurable look-up table based cells controlled by a special purpose control unit, thus easing the elaboration of critical kernels algorithms.

Features and advantages of the digital architecture according to this invention will become apparent from the following description of a best mode for carrying out the invention given by way of non-limiting example with reference to the enclosed drawings.

DETAILED DESCRIPTION

Figure 1:
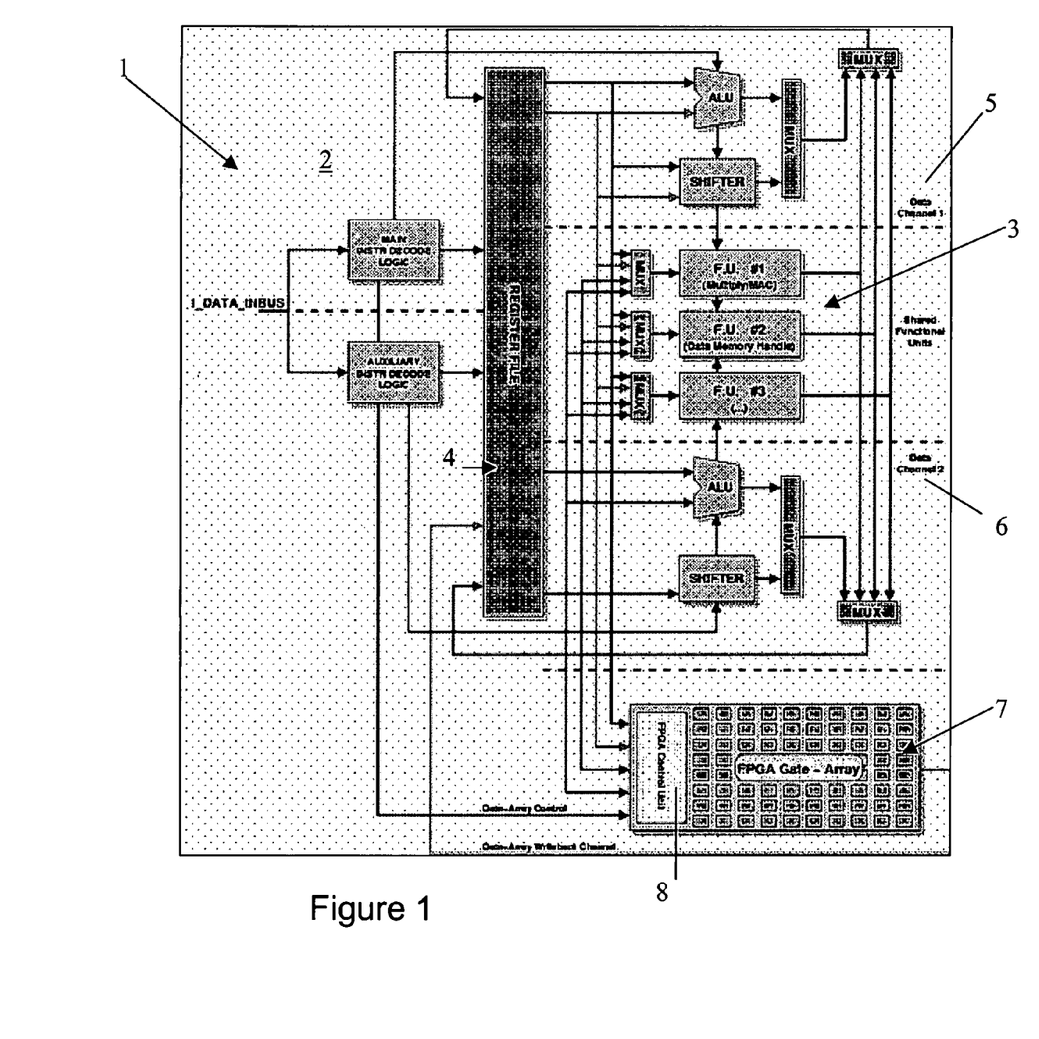
FIG. 1 is a block diagram of a digital architecture for digital signal processing according to an embodiment of the present invention.

With reference to the drawings views, generally shown at 1 is a digital embedded architecture realized according to an embodiment of the present invention for digital signal processing based on reconfigurable computing. The architecture 1 is schematically shown in FIG. 1 and referred to hereinafter as "XiRisc" (Extended instruction set RISC).

The XiRisc architecture 1 comprises a processor 2 and a memory device 3 integrated into a same chip. The processor 2 is structured to implement a Very Long Instruction Word (VLIW) RISC architecture featuring two concurrent, pipelined data elaboration channels operating concurrently over a set of general purpose hardwired function units specifically designed to improve its performance in a signal processing application environment.

Target applications for the architecture 1 include a relevant collection of signal processing algorithms. For instance, the main environments where the proposed architecture 1 may offer valuable advantages are multimedia applications such as audio and image compression and decompression standards, security applications such as code encryption and voice/image recognition, and telecommunications protocol management such as TCP/IP and UMTS.

A detailed analysis of the cited algorithms could explain how the computational load that they require is not uniformly distributed. For instance, small and very critical kernels, that can be described by few lines with high level programming languages, often require huge portions of overall processing time and energy, while all the many other functionalities composing the algorithm, albeit critical to its completion, become negligible in terms of resource utilization.

The described embodiment of the present invention focuses on easing the elaboration of such critical kernels, partitioning the computational load that they introduce on two concurrent elaboration cores: the first relying on a standard software-based compilation on a standard digital processor core, and the second focused on hardware programmable logic, to be performed on the cell array.

The processor 2 is provided with an additional run time configurable data path, capable of introducing a potentially infinite number of virtual application specific function units.

The data path is tightly integrated in a processor core 3, receiving inputs from a register file 4 and writing results on dedicated write back channels 5, 6 over the register file 4.

The architecture 1 is thus effectively based on three different and concurrent data elaboration flows, two of which are fed each cycle by instruction fetch and one based on an independent, variable latency pipeline implemented on the configurable datapath.

The instruction set extension is that of a reconfigurable architecture. The hardware extension is modeled as any other function unit of the processor 2, fully controlled by assembly instructions that are "in lined" in the source code. Manual identification of the extracted computational kernels is provided too.

The main difference between the proposed embodiments and other previously described architectures is that the reconfigurable function unit (PiCoGa) is not a hardware-based FPGA device but rather a configurable data-path controlled by a dedicated control unit 8.

All the known solution including just a hardware based embedded FPGA may have two possible drawbacks:

FPGA usage and programming involves hardware development issues not usual to compilation tools and users proficient in high level languages;

Up to now, FPGA-based units are either hardware based devices that involve a large silicon area, a relevant energy consumption and heavy reanalysis of the target algorithms in order to be executed on the array, or small units that are not capable to efficiently handle multi cycle latency instructions, and are often limited to combinatorial elaboration only, severely restricting the possible application domains.

However, a specific special purpose and configurable gate-array 7 has been advantageously provided to handle configurable pipelines of data. Hereinafter, we will make reference to this specific array as "PiCo-Array", or Pipelined-Configurable-Array.

Rather than being some kind of embedded, programmable hardware logic array, the PiCo-Array is a special function unit, comprising a pipelined array of lookup-based, configurable cells especially designed to virtually emulate a microprocessor data path.

More specifically, topology of elaboration inside the PiCo-Array is not symmetrical in the two directions: cells are grouped in rows, each representing a possible stage of a customized pipeline.

The PiCo-Array structure 7 can easily be represented by a control data flow graph, each row (or group of rows) corresponding to a different state.

Differently from all existing configurable devices, the PiCo-Array pipeline activity is controlled by a dedicated control unit 8. The unit 8 generates control signals for each row of the array 7: every clock cycle only the rows involved in the computation phase to be executed in that specific cycle are activated, in a dataflow fashion.

In order to support implementation of high level language constructs such as while and for loops, each array row can generate a feedback signal for the control unit 8, that may represent a Boolean value from a condition check performed in the array core.

For this reason, the PiCo-Array 7 not only supports multi-cycle functions, but it is explicitly structured to handle configurable pipelines, even deep ones.

Each reconfiguration of the array may implement a peculiar data flow, with a number of stages suitable for the functionality to be performed that could even be unknown at compilation time. In fact, PiCo-Array latency instructions, as well as their results may depend on internal status informations stored in some cell register by previous instructions, thus dramatically reducing the required data throughput on the register file, that was a severe limitation to previous implementations.

The following discussion considers the computational model adopted for an embodiment of the present invention.

The XiRisc computational model takes advantage of strong synergy between different units tightly integrated in a single core.

In the prior art solutions, FPGAs behaving as co-processing or function units need to implement entire computational kernels to achieve results that justify the communication overhead due to their inclusion. As a consequence, when a specific task is composed of functions suitable to be mapped on a hardware-oriented device and operators which could not be efficiently implemented in such devices, it has either to be completely executed on the processor core leaving the FPGA unused or to be entirely re-mapped on the array stalling for long periods processor execution.

On the contrary, the pipelined approach of the PiCo-Array makes the communication overhead with other function units as small as possible, thus allowing to efficiently partition the operations composing a single task to the function unit that best fit them.

System control, memory and I/O interface, and general purpose arithmetics are performed on the two hardwired channels 5, 6, whose VLIW configuration allows them to maintain a very high access rate to memory. Wide multipliers, variable shifters, MACs which are so difficult to implement efficiently in FPGAs are executed on dedicated hardwired function units.

The configurable unit exploits parallelism of small portions of the task, implementing short-latency, hardware intensive application specific operators. In this way, utilization of the PiCo-Array 7 considerably increases, minimizing program flow stalls and achieving a considerable parallelism between available resources, thus justifying its cost in terms of area for a wide range of applications.

The XiRisc 32-slots register file features four read ports, that are used to support the issue of two RISC instructions each clock cycle. Two write ports are reserved for the two hardwired pipeline channels 5, 6, while two other ports are entirely dedicated to PiCo-Array 7 results write back, avoiding introduction of dedicated logic handling competition on the register file ports.

Given the unpredictable latency of PiCo-Array instructions 10, Read-After-Write (RAW) hazards may occur on the destination registers of such instructions.

Figure 2:
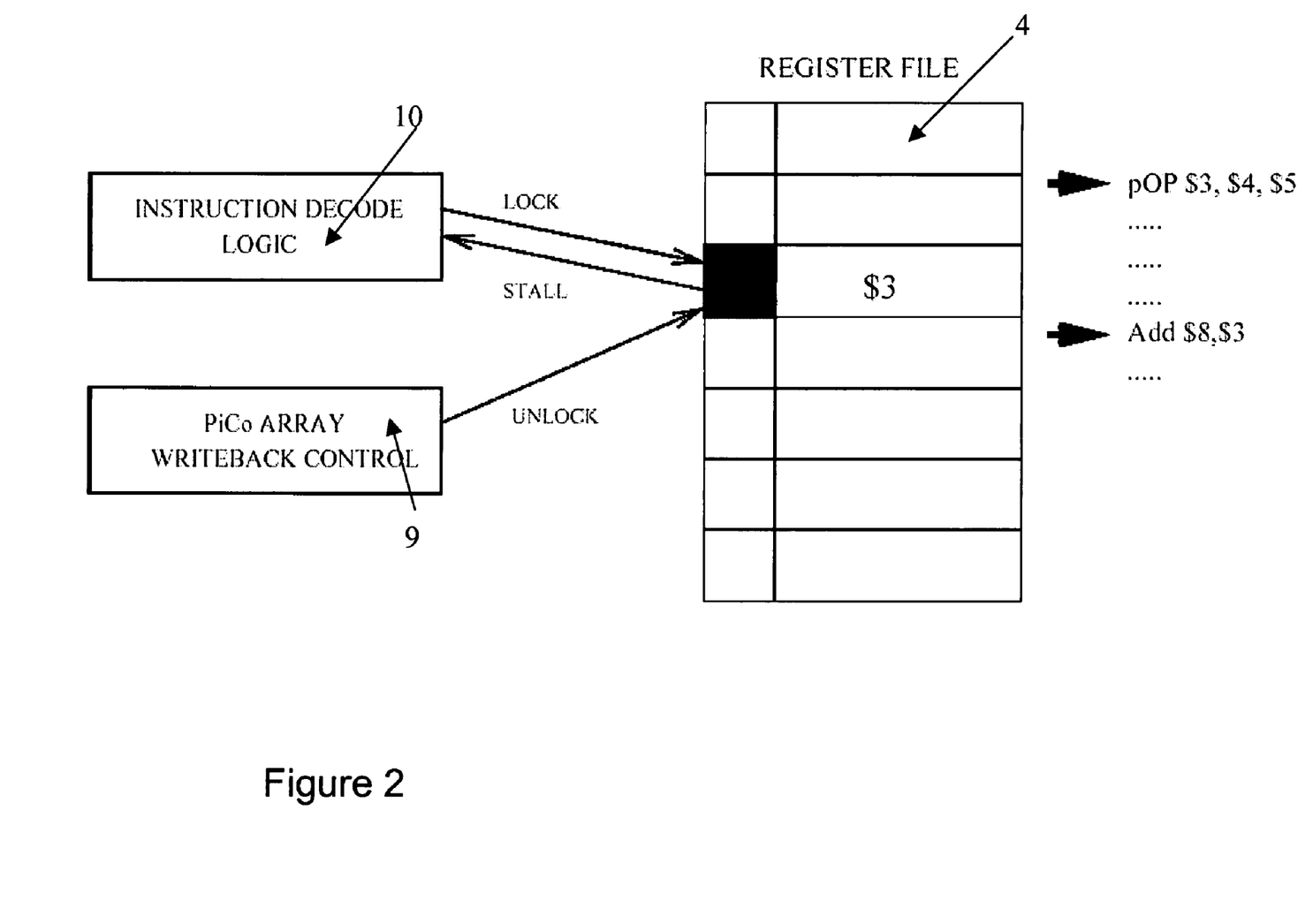
FIG. 2 is a block diagram of a hardware register locking mechanism of a register file incorporated into the architecture of FIG. 1 according to an embodiment of the invention.

A hardware register locking mechanism, shown in FIG. 2, has been introduced as the least intrusive way to handle such hazards. When a PiCo-Array instruction 10 is decoded its destination registers are locked, so that any following instruction trying to access them will cause a processor stall.

Normal execution is restored only when the PiCo-Array completes the write-back operation 9, unlocking its destination registers.

For all kinds of reconfigurable architectures described so far, a very critical issue is the programming of the embedded configurable device. The reconfiguration of a gate array 7 can take hundreds to thousands of cycles, depending on the programmed region size.

Even in cases when elaboration can in principle continue concurrently on other processor resources, the scheduling of the program flow will hardly be able to feed enough instructions to avoid stalls, that could overcome the benefits deriving from the use of the array. In the digital architecture according to an embodiment of the present invention, three different approaches may be adopted to overcome these limitations.

Multi-context programming: According to an embodiment of the invention, the PiCo-Array 7 is provided with a first level cache, storing four configurations for each logic cell. Context switch takes only one clock cycle, providing four immediately available instructions.

Region partitioning: According to an alternative embodiment of the invention, the array 7 is structured in blocks of dynamically variable size 12 (shown in FIG. 4). A block 12 can be reprogrammed while other blocks 12 are under execution, so that careful scheduling of operations and reconfigurations may result in no cache miss penalties even when the number of used configurations is large.

Configuration cache: According to an alternative embodiment of the invention, in order to support complete concurrency between processor 2 execution and PiCo-Array 7 programming, a special configuration cache is added to the architecture 1, featuring a dedicated very large (192-bit) bus to the array. Compression techniques are also used to reduce both size and time of configuration. The configuration process is triggered by the issue of a pGA-load instruction (see FIG. 3).

Figure 3:
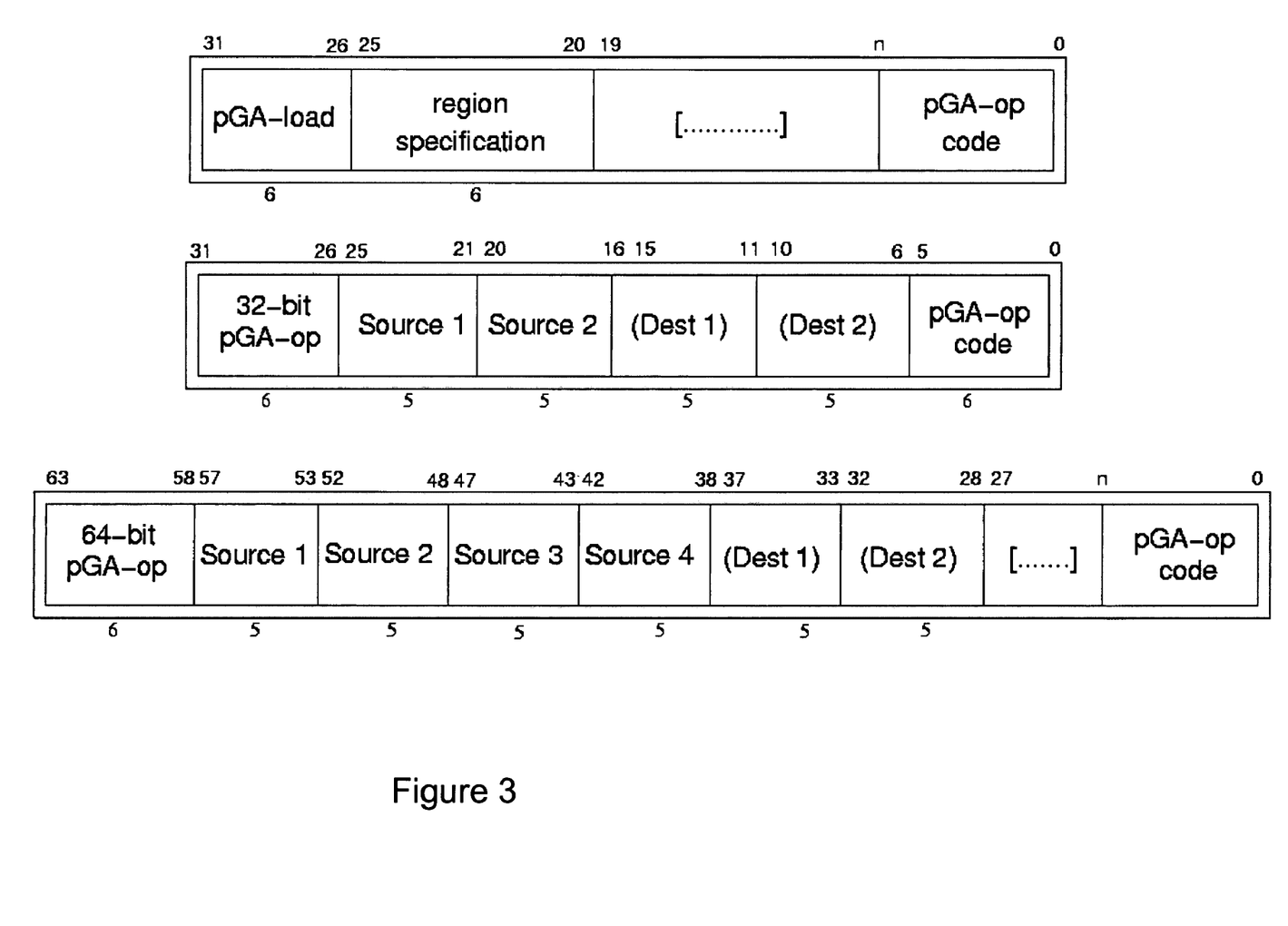
FIG. 3 is a schematic view of a special configuration cache added to the architecture of FIG. 1 according to an embodiment of the invention.

All possible p-array operations are identified by a pGA-op code, whose length is not fixed (minimum six bits). Each pGA-load instruction contains information about:

A) the configuration to be loaded into the array and its location in the configuration cache,
B) the cache context (first level caching) and the block where the operation is to be downloaded. This information can be either stored in one of the processor registers 4, that is referenced by bits [25 . . . 21] of the instruction, or be expressed directly in bits [25 . . . 20] as an immediate operand.

Figure 4:
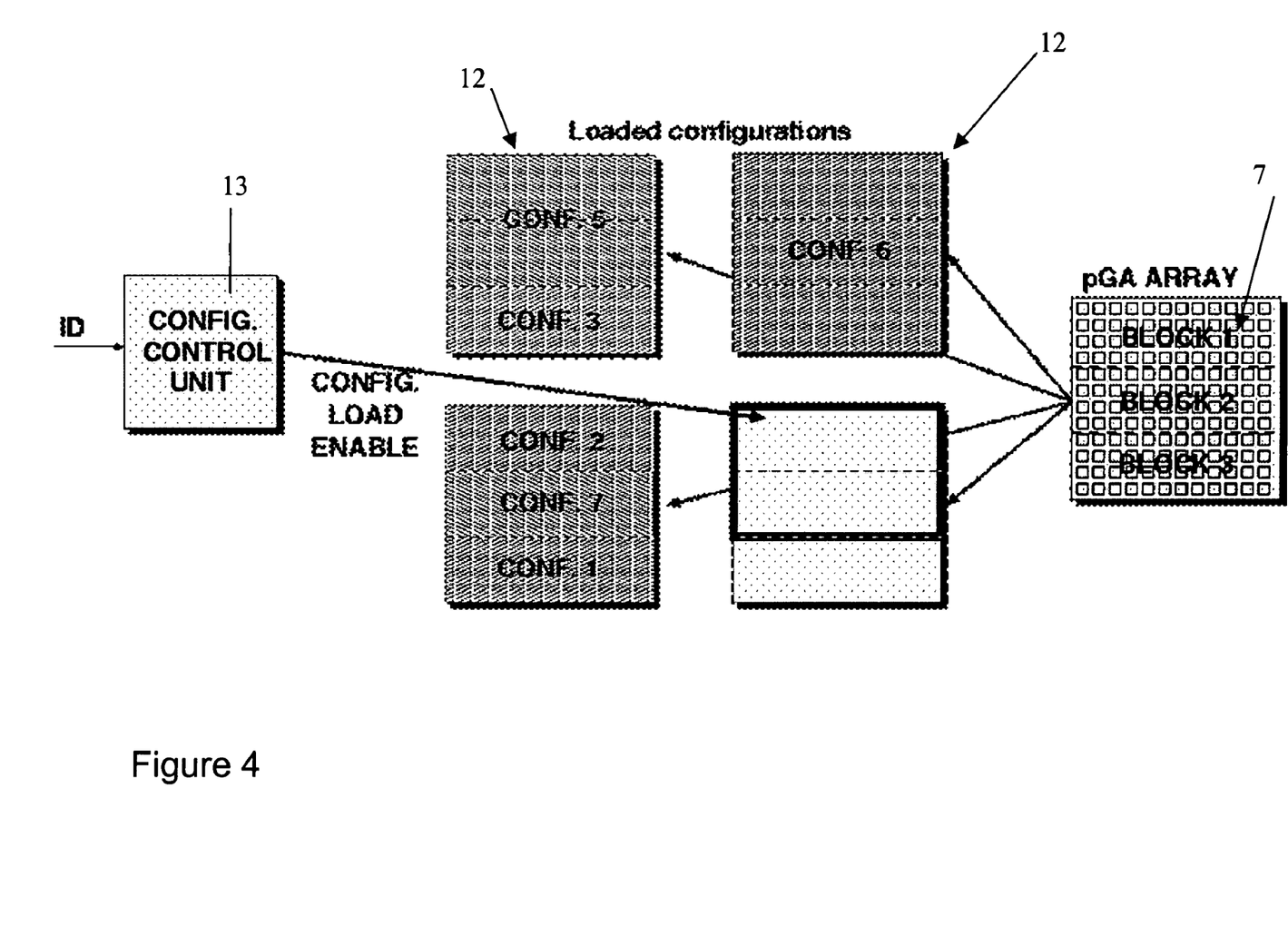
FIG. 4 is a block diagram of a detailed view of a particular gate array structure included in the architecture of FIG. 1 according to an embodiment of the invention.

A dedicated configuration handling logic 13 reads this information and controls the download mechanism. Processor elaboration will be stalled only if a pGA-op operation is issued requiring the same operation that is being configured, otherwise it will continue concurrently on the two hardwired channels 5, 6 or on a different block 12 or context of the array 7.

In any case, once the configuration has completed, elaboration will restart without altering program flow consistency. In case another pGA-load instruction is issued before the previous has finished its process (as introduced before, configuration lasts some hundred cycles depending on the required functionality) no stall occurs: the new pGA-load will be queued in a FIFO memory, and will be performed at the end of the current process.

If the FIFO queue is full, elaboration is stalled. Only In case a pGA-op instructions refers to a functionality that is neither loaded nor scheduled on the queue is an "illegal op-code" exception raised.

The architecture 1 may be part of an electronic system, such as a computer system.

Advantages of the digital architecture according to the invention may be summarized in the following features:

Performance Enhancement:
the reconfigurable unit allows for a very efficient implementation of software computational kernels, effectively decreasing the number of cycles required for the completion of a given algorithm, achieving speedup figures from 2x to 13x with respect to a standard programmable device.

Energy Consumption Minimization:
the mapping of computational cores on the reconfigurable unit allows for a significant minimization of the main sources of power consumption in programmable architectures, that is instruction fetch and access to the register file. Overall energy consumption figures up to 10% less with respect to a standard programmable device depending on the algorithm computed.

Familiar Environment for High Level Languages Programmers:
the pipelined structure of the PiCo-Array and the assembly-level granularity of tasks that are implemented on the array maintains a friendly environment for algorithmic development that does not necessarily involve hardware related skills.

Portability to High Level Software Development Tools:
the function unit model of the PiCo-Array/processor interface and the DFG-flow based pipeline control unit make the mapping of software kernels on the configurable unit straightforward for a standard C compiler, that can also take into account scheduling informations to enhance at compilation time instruction-level parallelism.

Very High Resource Parallelism:
the VLIW configuration, the presence of DSP specific hardwired function units and the processor/gate-array interface allows for a very high level of parallelism in computation. In particular, processor stalls due to interlocks and to the reconfiguration process are significantly less with respect to existing reconfigurable architectures.

Better Overall Performances Over the Prior Art Solutions:
in the prior art solutions no explicit pipeline handling device is embedded in the configurable device to handle data flow on a software-based fashion. In contrast, in an embodiment of the present invention the gate-array configuration is based on a logic synthesis approach, rather then using high-level languages constructs, that would be more familiar to the user and easier to be handled with high-level language like C.

What is claimed is:

1. A digital embedded architecture, including a microcontroller and a memory device, suitable for reconfigurable computing in digital signal processing and comprising:
a processor,
a data elaboration channel comprising a reconfigurable function unit based on a pipelined array of reconfigurable data-path oriented cells, and
a special purpose reconfigurable control unit operable to control which rows of the array of reconfigurable data-path oriented cells are activated, each row representing a stage of a customized pipeline, the special purpose reconfigurable control unit controlling activation of the rows in a dataflow fashion.

2. The digital embedded architecture according to claim 1, wherein said reconfigurable function unit includes hardware-based Field Programmable Gate Array (FPGA) embedded devices.

3. The digital embedded architecture according to claim 1, wherein said data elaboration channel is tightly integrated in a processor core, receiving inputs from a register file and writing results on dedicated write back channels over the register file.

4. The digital embedded architecture according to claim 1, wherein said pipelined array of reconfigurable data-path oriented cells implements a configurable run-time with a variable latency data path emulating virtual application specific function units.

5. The digital embedded architecture according to claim 4, wherein the architecture is based on three different and concurrent data elaboration flows, two of which feed each cycle by instruction fetch and one based on an independent, variable latency pipeline implemented on the reconfigurable data-path.

6. The digital embedded architecture according to claim 2, wherein said gate-array is a pipelined array of configurable lookup-table based cells virtually emulating a microprocessor data path.

7. The digital embedded architecture according to claim 1, the whole array being represented by a control data flow graph, each row or group of rows corresponding to a different state and being controlled for activation by the special purpose reconfigurable control unit.

8. The digital embedded architecture according to claim 1, wherein said special purpose reconfigurable control unit is a hardwired, run-time programmable Data-Flow-Graph based control unit synchronizing the pipelined computation by the gate-array cells.

9. The digital embedded architecture according to claim 3, wherein said register file comprises four read ports, used to support the issue of two RISC instructions each clock cycle, and two write ports reserved for said two hardwired pipeline channels; two other ports being entirely dedicated to write back results of the pipelined array, thus avoiding introduction of dedicated logic handling competition on the register file ports.

10. The digital embedded architecture according to claim 1, wherein said pipelined array comprises a first level cache, storing four configurations for each logic cell; and further comprising a context switch for taking only one clock cycle and providing four immediately available instructions.

11. The digital embedded architecture according to claim 1, further comprising a reconfiguration mechanism for allowing very fast configuration completely concurrent with processor execution, said reconfiguration mechanism including the configurable array being structured in blocks, having at least eight rows each, each block being reprogrammed while the other blocks are under execution.

12. The digital embedded architecture according to claim 1, wherein the control unit is further operable to control synchronization of the array of reconfigurable data-path oriented cells and the processor.

13. The digital embedded architecture according to claim 1, wherein the rows are grouped together to form a pipeline stage of an implemented data-path.

14. The digital embedded architecture according to claim 13, wherein the control unit controls pipeline execution of the array of reconfigurable data-path oriented cells by using a dataflow model to calculate for each cycle which row is to perform computations.

15. The digital embedded architecture according to claim 13, wherein the control unit generates control signals for each row selectively activating the rows of the pipeline stages to make computations in each clock cycle.

16. The digital embedded architecture according to claim 13, wherein the cells of the array generate signals to cause the control unit to implement data-dependent conditional executions.

17. The digital embedded architecture according to claim 13, wherein the pipelined array of reconfigurable data-path oriented cells implements a configurable run-time with a variable latency data path with each row being controlled by control signals generated by the control unit so as to be capable of emulating virtual application specific function units.

18. The digital embedded architecture according to claim 13, wherein the data elaboration channel is tightly integrated in a processor core receiving inputs from a register file and writing results on dedicated write back channels over the register file, and further is linked with the processor core through an interface between processor control logic and the control unit.

19. The digital embedded architecture according to claim 18, wherein a destination register file corresponding to any decoded instruction of the pipelined array is locked so as to cause a processor stall in response to any following decoded instruction which would also access that destination register file, and wherein normal execution is restored when the pipelined array completes a write-back operation and the destination register is unlocked.

20. The digital embedded architecture according to claim 19, wherein the locking of the destination register file supports enhanced levels of resource utilization parallelism by allowing unpredictable latency instructions to be executed on the configurable unit without altering program flow consistency.

21. The digital embedded architecture according to claim 1, wherein the array of reconfigurable data-path oriented cells and control unit are multi-context to provide a first level cache of immediately available functions by integrating in the array and control unit additional memory cells for each configuration bit.

22. The digital embedded architecture according to claim 1, wherein the array of reconfigurable data-path oriented cells is organized in regions, each region being composed of a configurable number of array rows, and wherein a region is reprogrammed while other regions are under execution and the control unit controls operation of the cells in each region and controls operation between regions.

23. The digital embedded architecture according to claim 22, wherein the regions compute in parallel, the regions being activated by the control unit for writeback operation.

24. A digital embedded architecture, comprising:
an array of reconfigurable data-path oriented cells arranged in rows, each row representing a stage of a processing pipeline;
a configuration control unit operable to configure the array of reconfigurable data-path oriented cells; and
an operation control unit operable to control in a dataflow fashion which rows of the array of reconfigurable data-path oriented cells are activated to implement the processing pipeline.

25. The digital embedded architecture of claim 24 wherein the operation control unit generates control signals each clock cycle which activate only those rows of the array that are involved in a computation phase to be executed in that clock cycle.

* * * * *